United States Patent [19]

Tizzi

[11] Patent Number: 4,716,750
[45] Date of Patent: Jan. 5, 1988

[54] PROCESS FOR OBTAINING COMPOSITE HOLLOW MEMBERS FROM VARIEGATED LONGITUDINAL STRIPS, EMBODIED WITH OR WITHOUT A REMOVABLE CORE

[76] Inventor: Valtiero Tizzi, Via Clementini, 2, 47037 Rimini (Forlì), Italy

[21] Appl. No.: 844,126

[22] Filed: Mar. 26, 1986

[30] Foreign Application Priority Data

Apr. 2, 1985 [IT] Italy ................................ 3389 A/85

[51] Int. Cl.$^4$ ........................ B21G 39/02; B23P 15/00
[52] U.S. Cl. ...................................... 72/52; 29/160.6; 29/514; 29/521; 72/368
[58] Field of Search ................ 29/513, 514, 515, 521, 29/160.6; 72/51, 52, 368, 370

[56] References Cited

U.S. PATENT DOCUMENTS

| 1,168,885 | 1/1916 | Holden | 72/52 |
| 1,386,335 | 8/1921 | Hoffman | 29/521 |
| 1,461,848 | 7/1923 | Jacquiery | 72/52 |
| 1,863,873 | 6/1932 | Quarnstrom | 72/52 |
| 3,208,140 | 9/1965 | Mayrath | 72/52 |
| 3,372,563 | 3/1968 | Walsh | 72/52 |
| 3,864,814 | 2/1975 | Bagge | 29/514 |

Primary Examiner—Robert L. Spruill
Assistant Examiner—Donald R. Studebaker
Attorney, Agent, or Firm—Birch, Stewart, Kolasch & Birch

[57] ABSTRACT

The invention relates to a process by means of which to obtain hollow members from variegated longitudinal strips, longitudinally assembled. The hollow member obtained may either remain hollow or be provided with a removable core, and can be embodied in precious or semi-precious metals, or their alloys; strips of such materials are utilized to make up the various components of the hollow member's nominal cross section, and the end-product is a new type of multi-colored semi-finished article for use in the manufacture of high-class and costume jewelry, as well as in other fields such as the production of objects of art and/or general interior design.

9 Claims, 16 Drawing Figures

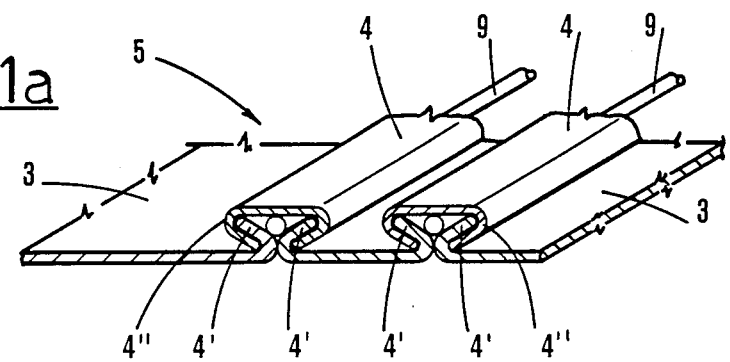
FIG 1a
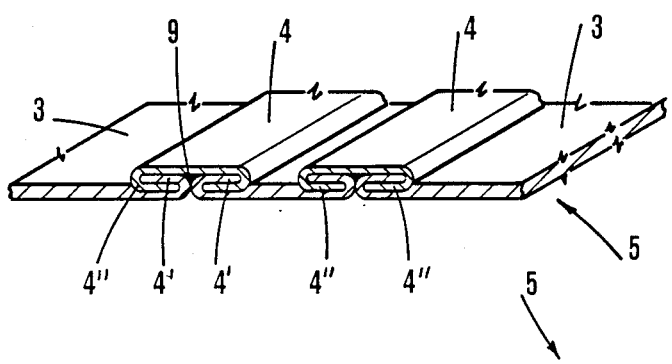
FIG 1b
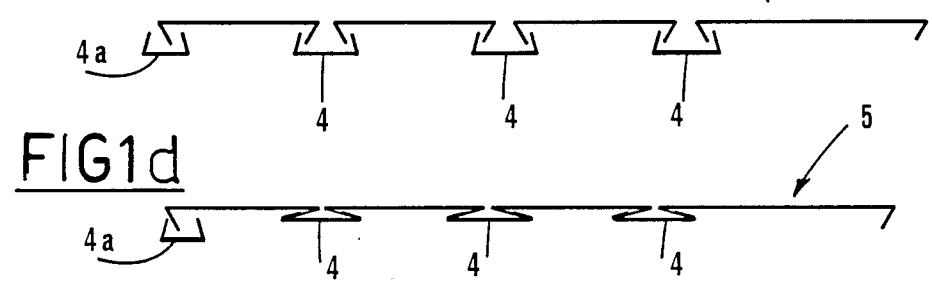
FIG 1c
FIG 1d
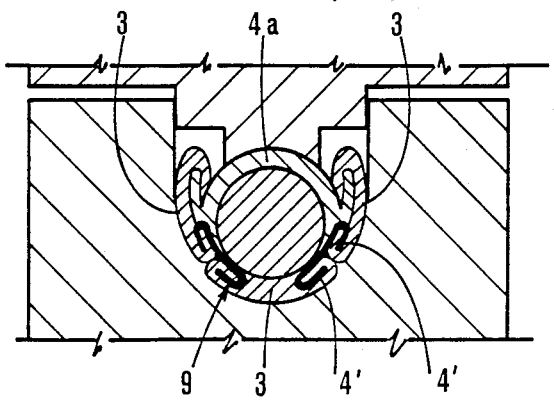
FIG 4a
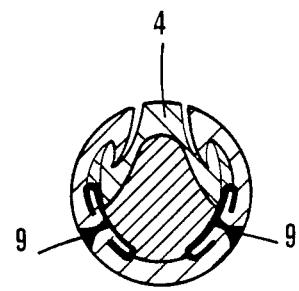
FIG 4b

PROCESS FOR OBTAINING COMPOSITE HOLLOW MEMBERS FROM VARIEGATED LONGITUDINAL STRIPS, EMBODIED WITH OR WITHOUT A REMOVABLE CORE

BACKGROUND of the INVENTION

The prior art in this field embraces a process in which metal strips of suitable gage and width are cut and shaped into a round profile, usually ⅜" across, by repeated passes through a forming machine to the end of obtaining a composite tube the edges of which are welded together directly in the machine; the edges of the strips are first united by pressure from forming rolls in order to attenuate thermal expansion during the welding step, for which a plasma-arc torch is employed, utilizing an argon gas shield (no use is made of solder, as the fused tube must retain uniform shape during subsequent swaging operations, and any molecular break-up that would be caused by the introduction of a more ductile alloy has therefore to be avoided). Needless to say, the initial gage of such metal strip must be heavy enough to ensure that the plasma-arc process remains efficient. The continuous composite tube obtained in this way is then suitably annealed, whereupon its annular cross section is reduced by rotary swaging, which involves slipping the formed tube over a mandrel taking the form of a rod, one end of which is anchored, the other integral with a hardened pin of larger dimensions designed to bear the impact of the contoured swages; the swages rotate against the outer surface of the tube in such a way as to bring about a gradual reduction in the annular cross section, while the tube itself, gripped in the clamp of a chain-drive drawing-bench, is extended by a carriage hitched to the chain via a spike.

This initial reduction of the tube's annular cross section is followed by an intermediate annealing stage, whereupon the swages and the mandrel are changed, and a further reduction of the annular cross section is brought about; further annealing the swaging passes are implemented in this way until a tube of approximately 5/32" diameter is produced.

A continuous wire is now threaded into the tube to serve as a solid core, and the tube subjected to repeated drawing until brought down to the final diameter envisaged, say 3/32". In such an instance, the composite drawn tube ultimately produced will exhibit an outer annular section of some 0.0070" thickness. Clearly enough, the selection of a greater or lesser final thickness will dictate the gage of strip to be adopted when forming the tube initially, though it will be remembered that a certain minimum gage is essential if the plasma-arc weld is to give efficient results.

Where the requirement is for a hollow member, the tube is transferred to a further machine designed for removal of the core wire (copper or steel). This removal operation becomes necessary where ultimate thickness of the tube wall needs to be of the order of between 0.0039" and 0.0059". The machine utilized consists of a steel beam with tracks, some 20 ft long; one end of the tube is clamped between grips, mounted to a carriage that traverses the entire length of the beam, and the remaining end made fast between further grips integral with a hydraulic cylinder. With both ends held in this manner, a measure of tensile stress is imparted to the tube; pincers with cutting edges are used to sever the wall of the tube at either end, and the cylinder, actuated by a hydraulic power pack, begins pulling on the core wire. The diameter of the core wire reduces under tensile stress, and can be easily removed from the surrounding tube, which thus remains free.

Manufacturing methods of the prior art type thus outlined are not able however, to produce hollow members which exhibit a variegated appearance and are embellished with localized visual features composed of different colors.

Accordingly, it is an object of the invention to create the possibility of embodying variegated hollow members with color-enhanced geometry and ornamental features, in an infinite variety of ways.

It is likewise an object of the invention to provide for the embodiment of hollow members in such a way that a solid core may be retained, in order to permit utilizing the members for forming chain or necklace links, and removed following the formation of such links.

A further, important object of the invention is to provide for the embodiment of a hollow member, in cases where a decidedly thin annular cross section is required, by way of seam-folding together a number of metal strips or moldings arranged edge to edge and gathered into a tube, in such a way that their subsequent fusion by plasma-arc methods need not be conditioned by the initial gage of the metals employed.

SUMMARY of the INVENTION

The process described and claimed herein is able to provide an answer to the problem of how manufacturers may be rid of the difficulties, associated with plasma-arc methods, that arise when the requirement is for hollow members of thin annular section, permitting as it does of departing from thinner gages and streamlining the number of swaging and drawing passes, and accordingly, of cutting production costs considerably.

Another problem to which the process affords an answer is that of how to embody chain or necklace links with a continuous variegated pattern covering the entire length of the single link, in such a way that the ends of each link may be fused together with no external application of solder, an advantage which is achieved by incorporating solder into the hollow member during its formation.

BRIEF DESCRIPTION of the DRAWINGS

The process will now be described in detail, by way of example, with reference to the accompanying drawings, in which FIGS. 1a & 1b are respective illustrations, (a) of a laminate produced by seam-folding a number of differently colored metal strips arranged edge to edge, and (b) of the same laminate flattened along the seams;

FIGS. 1c & 1d are respective illustrations, (a) of a composite laminate on which no seam-folding operation has yet been carried out, and (b) of the same laminate seen with all seams folded and flattened, apart from those at either end;

FIGS. 4a & 4b provide a schematic illustration of the type of forming machine utilized, in which the cross section of the mandrel can be altered gradually so as to produce a hollow member from laminates of the kind illustrated in preceding drawings;

DESCRIPTION of the PREFERRED EMBODIMENTS

Figure 2A:
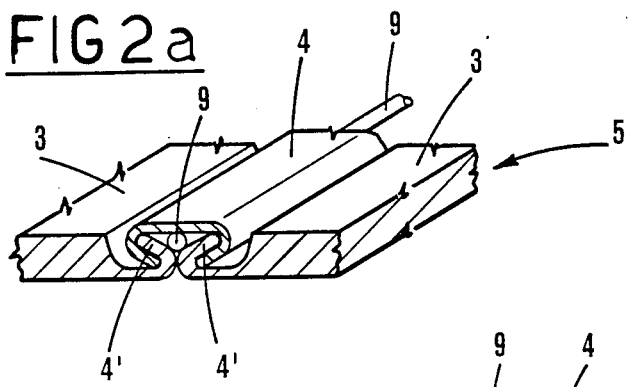
FIGS. 2a & 2b are detailed illustrations of one seam-folding method adopted, which show the folded seams before and after flattening, respectively.

The specific intent behind the process disclosed is that of embodying a hollow member 1 from continuous longitudinal strips 2 of different color, which may exhibit a variety of geometrical outlines or molded surfaces, flat and contoured alike; FIGS. 6a, 6b, 6c, 6d and 6e show examples of such embodiments. Generally considered, the process involves preparation of a number of longitudinal moldings 3 from at least two different metals or metal alloys with distinctly dissimilar coloring; these are arranged edge to edge in such a way as to make up a composite, variegated surface which ultimately becomes that of the hollow member 1. The formed hollow member, which exhibits a given annular cross sectional thickness at the outset, is then subjected to rotary swaging and annealing operations repeated in sequence, and to additional drawing if necessary, until arrival at the ultimate annular cross section envisaged, which will be considerably thinner than that exhibited at the outset.

In a first embodiment of the hollow member, the moldings are plain metal strips, of differing geometrical outline if so desired, which are joined tightly together by way of their relative edges; the joined edges will then be welded, and the laminate obtained is formed into a tube. The various strips can be joined and welded while still flat, then fed into a forming machine the sectional area of which can be modified progressively down to the requisite shape and size. Alternatively, the strips might be pass-welded, being formed and bent against a cylindrical support provided with a longitudinal recess for the weld between each pair, and from which the hollow member 1 produced can subsequently be withdrawn. This type of method would be employed where the initial gage of strip and the final thickness of tubular wall are not excessively fine.

Where a superfine tubular wall is required, however, longitudinal moldings 3 will be better embodied by forming or pressing such as to produce a folded lip 4' at each longitudinal edge. Each pair of moldings will then interlock, and, if appropriate, the joint obtained can be flattened under pressure. The longitudinal molding 3 might well exhibit matched folded lips 4' that fit one into the next in simple sequence, thus creating a single, universal molding as in FIGS. 3a and 3b. The possibility also exists of incorporating additional longitudinal moldings, joint moldings 4 in effect, either edge of which interlocks with the relative lip 4' of an adjacent longitudinal molding 3, as in FIGS. 1a, 1b, 1c and 1d.

In either of the above instances, moldings can be seam-folded together while still flat, thereby forming a composite rectangular laminate 5, and keeping apart one of the single moldings; this will serve as a longitudinal joint molding 4a by way of which to unite the edges of the laminate 5 when looped around into a tube. In this particular instance, the hollow member 1 is embodied by forming in dies the sectional area of which can be progressively decreased (FIGS. 4a and 4b), the laminate 5 being fed in from one side, and the joint molding 4a from the other. Laminate 5 and molding 4a gradually interlock, and deform progressively until the requisite curvature is achieved (see FIG. 4b).

Figure 5:
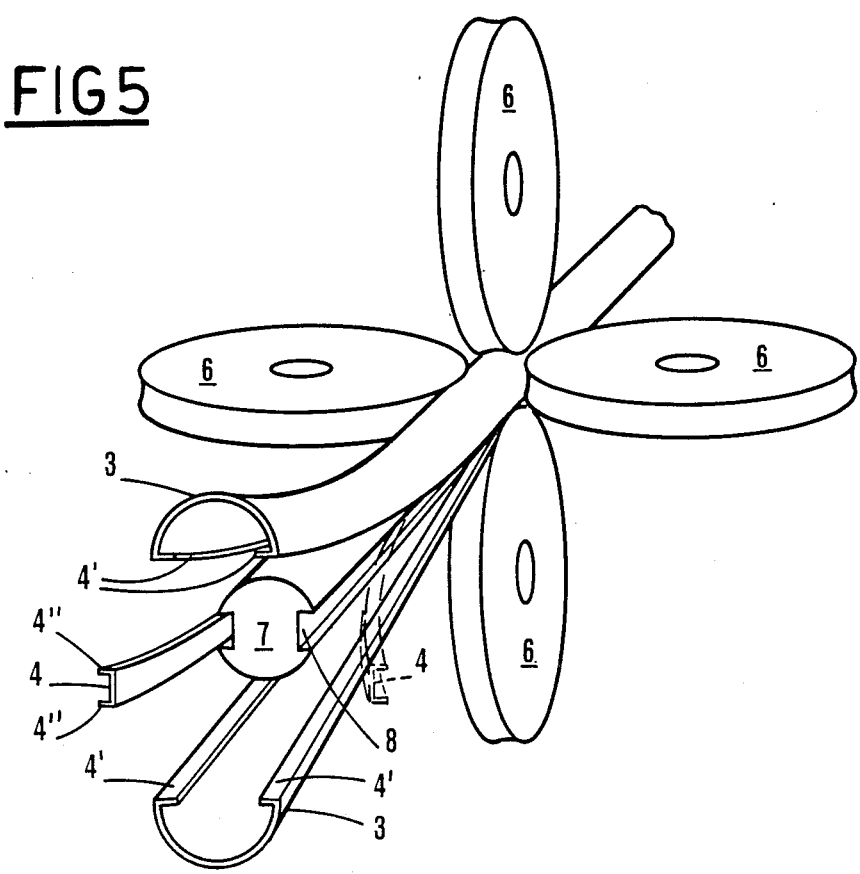
FIG. 5 illustrates an alternative forming station to that of FIG. 4a, which will likewise turn out hollow members, in this instance from previously contoured moldings.
Figure 6A:
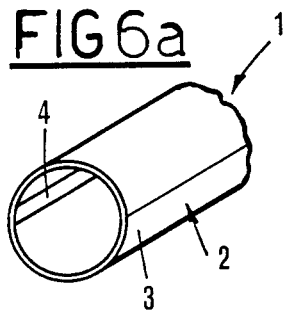
FIGS. 6a, 6b, 6c & 6d are examples of the final embodiment of hollow members obtained from metal strip or moldings as illustrated in the preceding drawings.
Figure 6B:
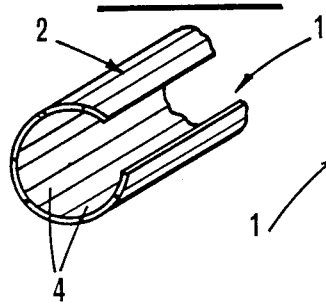
Figure 6C:
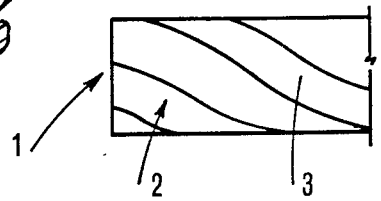
Figure 6D:
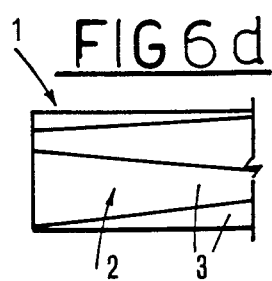
Figure 6E:
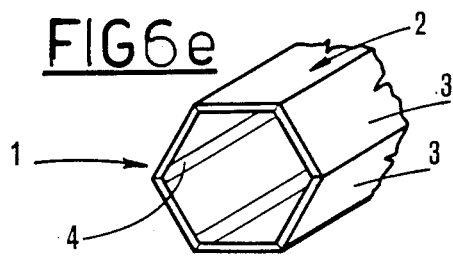

FIG. 5 illustrates a further method of embodying the hollow member 1, in which longitudinal moldings 3 are formed in advance, such that the requisite curvature is already built in, with folded lips 4' turned in toward the center of curvature; the joint moldings 4, on the other hand, have folded lips 4" which are directed away from the center of curvature. The seams of the moldings 3 and 4 interlock, and are folded together and flattened by a process utilizing contoured forming rolls 6, each urging against a respective molding and offset by an anchored mandrel 7 which affords the moldings 3 and 4 the necessary internal back-up. The mandrel 7 will be seen to have longitudinal channels 8 which substantially complement the shape of the joint moldings 4, and taper away to nothing as the composite is slid gradually along the mandrel 7. A forming process of this kind enables pre-assembly of the hollow member and initial flattening of the seams, and, given that subsequent steps of the process are designed to reduce the annular cross section of the hollow member by rotary swaging, the initial gage of the folded lips 4' and 4" would be calculated accordingly in order to guarantee best results.

Figure 2B:
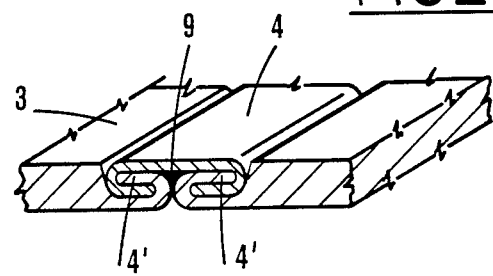
Figure 3A:
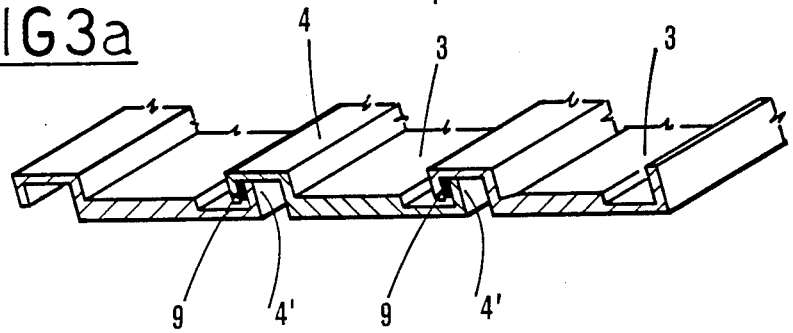
FIGS. 3a & 3b are similar illustrations of an alternative method of folding the mutually joined edges of a number of differently colored metal moldings, which show the joins before and after flattening, respectively.
Figure 3B:
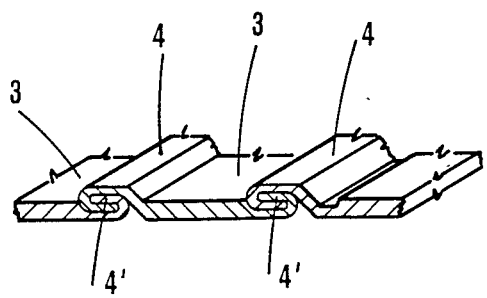

As the drawings show, constant thickness of the wall of the hollow member can be obtained simply by flattening the join, whether interlocked as in FIGS. 2a and 2b or as in FIGS. 3a and 3b. It will be appreciated that, in embodying the hollow member 1 by seam-folding longitudinal and joint moldings 3 and 4 one with the next according to the process, welding requirements no longer condition the process, and the manufacturer possesses the option of departing from gages even less than the minimum normally dictated by utilization of a plasma-arc torch.

A further feature of the process disclosed is that it affords the possibility of incorporating solder, more exactly, a drawn filament of solder 9, into the seams; having flattened the seams, the member 1 is subjected to a first annealing treatment by means of which to float the solder filament 9. The hollow member 1 will then undergo the same steps as already described in oder to arrive at the final shape and dimensions envisaged.

The incorporation of solder in this way is of significant usefulness in forming links for chains or necklaces, departing from a hollow member 1 as disclosed. Where the ultimate embodiment of such links is to be hollow, one of the moldings (an end-molding of the laminate, or the joint molding 4a) will be in a metal that can be destroyed by chemical means. With the hollow member 1 formed and reduced to its final dimensions, it is provided with a wire core, embodied in the same chemically-destructible material; in this way, discrete lengths of the composite member 1 which are shaped into links and concatenated will exhibit no bending creases that would spoil the appearance of the chain or necklace. The ends of each link will be joined, needless to say, by applying heat locally to the link at that point so as to float the incorporated solder and fuse the ends together. The completed chain or necklace is then subject to treatment using chemicals in order to remove, first, the one molding embodied in destructible material, and then the wire core, this being of the same material.

Finally, it will be observed that moldings with a flat or contoured transverse profile may also be adopted for the process, provided that the mandrel of the swaging equipment utilized offers the appropriate matching profile. The option likewise exists of embellishing the different longitudinal moldings 3 of a hollow member prior to assembly.

An end-product of the process disclosed herein will therefore consist, substantially, of hollow members composed from continuous longitudinal strips, which exhibit a variegated appearance, as well as featuring previously worked embellishment where appropriate provision is made.

What is claimed:

1. A process for producing composite hollow members from variegated longitudinal strips comprising the steps of:

preparing a number of longitudinal moldings by drawing or pressing said moldings so as to provide folded lips along the edges of said moldings, said folded lips being capable of being interlocked and flattened, wherein at least one of said moldings is a destructible molding formed from a chemically-destructible metallic material;

arranging said moldings adjacent to each other so that said folded lips become interlocked lips;

lodging solder between said interlocked lips;

flattening said interlocked lips under pressure so as to join said moldings into a tubular-shaped hollow member with a tubular wall and so as to create a variegated surface;

reducing the thickness of said tubular wall to a predetermined annular cross section threading a core member into said hollow member such that discrete lengths of said hollow member can be formed into links, said core member being formed from a chemically-destructible metallic member;

fusing the ends of said links following concatenation by floating said solder in order to form chains or necklaces; and removing said destructible molding and said core member by chemically treating said links.

2. The process as in claim 1, wherein said longitudinal moldings take the form of strips joined tightly together, and wherein the edges of said strips are welded one to the next.

3. The process as in claim 1, wherein said longitudinal moldings are flat and remain flat during said reducing step because of a prismatic shape of a swaging mandrel used for swaging.

4. The process as in claim 1, wherein said moldings are arranged longitudinally, and exhibit varying geometry when viewed in a plane.

5. The process as in claim 1, wherein said moldings are contoured along a transverse direction during said reducing step by use of a contoured swaging mandrel.

6. The process as in claim 1, wherein said moldings are embellished.

7. The process as in claim 1, wherein said moldings are interlocked and flattened while still flat, so as to create a composite rectangular laminate, one molding being kept apart to serve as a joint molding for uniting the outer edges of said laminate, and wherein said hollow member is formed using dies of progressively decreasing cross sectional area, and wherein said laminate is fed into said die from one side and said joint molding is fed into said die from a second side, such that said laminate and said joint molding interlock and deform progressively until a predetermined curvature is achieved.

8. The process as in claim 1, wherein the tubular wall of said hollow member is reduced by subjecting said hollow member to a repeated sequence of rotary annealing and swaging, and drawing if necessary.

9. The process of claim 1, wherein said solder is floated by annealing said hollow member prior to said reducing step.

* * * * *